G. GLEASON.
CATTLE STANCHION.
APPLICATION FILED JAN. 25, 1912.
1,030,724.
Patented June 25, 1912.
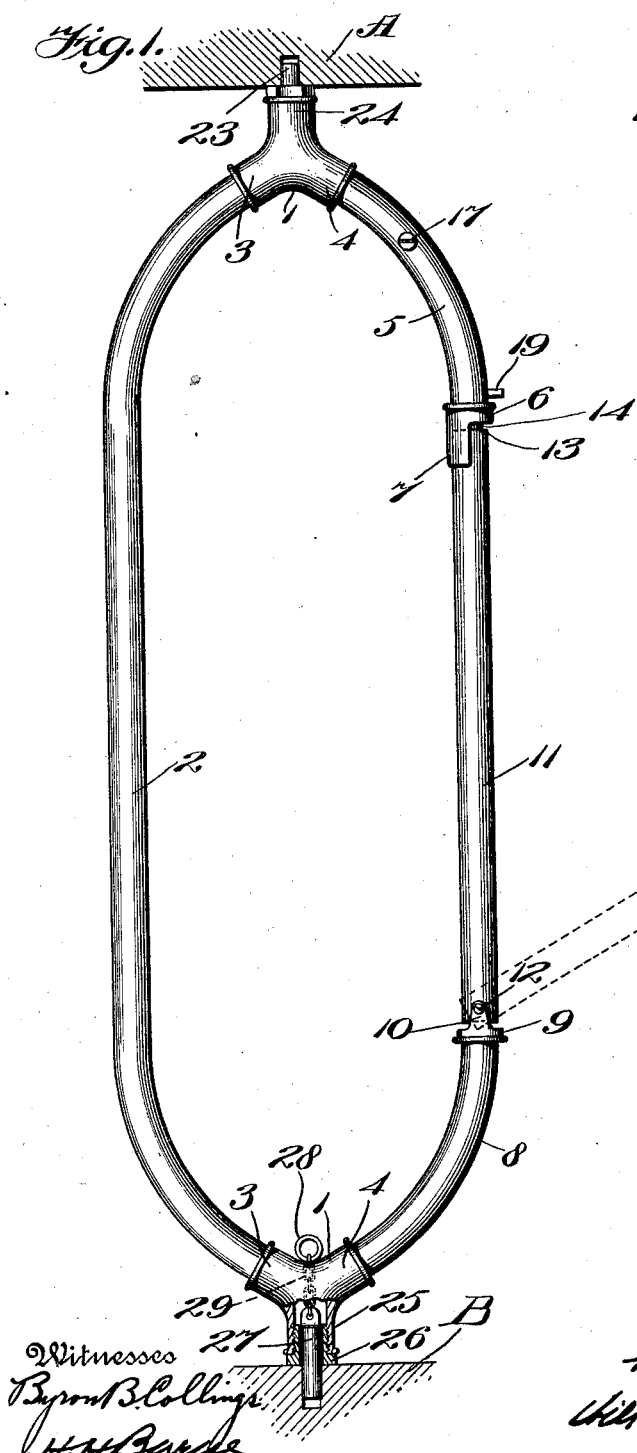
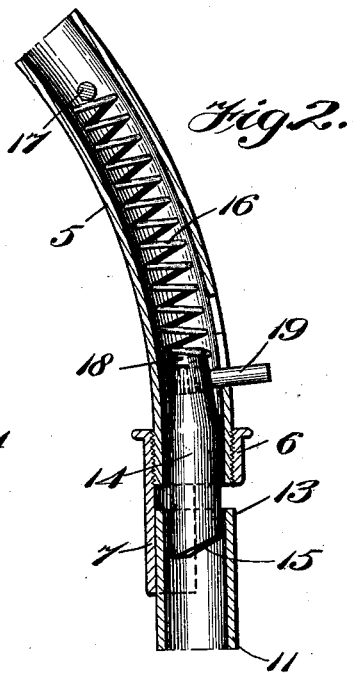
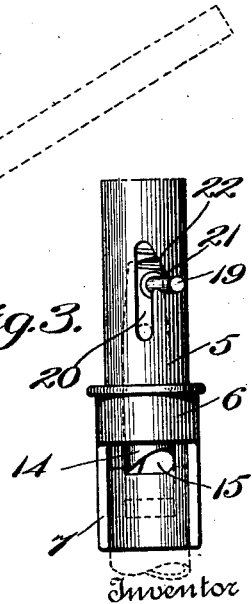
Witnesses
Byron B. Collings
H. H. Byrd
Inventor
George Gleason
by Wilkinson, Fisher & Wilkinson
Attorneys

UNITED STATES PATENT OFFICE.

GEORGE GLEASON, OF AUBURN, NEW YORK.

CATTLE-STANCHION.

1,030,724. Specification of Letters Patent. Patented June 25, 1912.

Application filed January 25, 1912. Serial No. 673,389.

*To all whom it may concern:*

Be it known that I, GEORGE GLEASON, a citizen of the United States, residing at Auburn, in the county of Cayuga and State of New York, have invented certain new and useful Improvements in Cattle-Stanchions; and I do hereby declare the following to be a full, clear, and exact description of the invention, such as will enable others skilled in the art to which it appertains to make and use the same.

The present invention relates to cattle stanchions, and has for its purpose to provide a device of that character wherein the animal secured will have the maximum degree of freedom without being entirely free; and wherein the construction of the device enables its ready application to or removal from the mounting within the stall.

The invention has for its further purpose to provide a device of the character in question which may be conveniently opened and closed for attachment to the animal's neck; and wherein the construction is of the required durability, and presents a neat and compact appearance when in use.

With these and other objects in view the invention consists in the novel details of construction and combinations of parts more fully hereinafter disclosed and particularly pointed out in the claim.

Referring to the accompanying drawings forming a part of this specification in which like numerals designate like parts in all the views:—Figure 1 is a front elevational view of the device in applied position; Fig. 2 is a vertical sectional view thereof disclosing the locking device; and, Fig. 3 is a front elevational view of the locking device.

Referring to the construction in detail, the device consists of a pair of Y-members 1 of tubular construction and oppositely disposed, as shown in Fig. 1. A tubular bar 2 shaped to conform with the side of the animal's neck has its respective ends engaging with the lateral legs 3 of the members 1. The ends of the bar 2 are received within the tubular members 3 and secured thereto in any appropriate manner. The other legs 4 of the Y-members 1 are in like manner connected by a sectional bar, which conforms with the animal's neck and which, with the bar 2, securely holds the animal's head against removal from the stanchion, except when the animal is to be released.

The second bar of the stanchion consists of a curved bar section 5, which has one end thereof screw-threaded, or in any other manner secured to the lateral leg 4 of the upper Y-member 1, and which at its other end is provided with a collar 6 fixedly secured thereto, and which is formed with an extension 7 providing a stop, for a purpose to be presently described. A curved bar section 8 has one end secured to the lower lateral leg 4 in a manner similar to that of the member 5, and at its opposite end said bar section 8 is provided with a collar 9, which has formed therewith a pair of lugs, or ears 10. A straight bar section 11 is pivotally mounted at its lower end between the lugs 10, through the medium of a pivot pin 12 and the upper end 13 of said section 11 is adapted to engage with the stop 7 of the collar 6, and thereby be centered with respect to the lower end of the tube 5 whereby to receive a locking bolt 14, that is mounted to have movement within the adjoining ends of the tubular sections 5 and 11, as clearly shown in Fig. 2.

The bar 11 is adapted to be swung on its pivot from the position shown in full lines in Fig. 1 to the position shown in broken lines in said view, for the purpose of applying the device to the neck of the animal to be secured, and when swung into engagement with the stop piece 7 the upper end 13 is adapted to engage with the bevel face 15 of the locking bolt 14 and release said bolt to snap into engagement with the open end of said bar through the tension of the spring 16 which tends to, at all times, force the bolt 14 downwardly. The spring 14 is contained wholly within the tubular section 5, and has one end thereof secured to a pin 17 in said tube, and at its lower end 18 is secured to the bolt 14, in any suitable manner.

It is proposed that the bolt 14 be positioned to receive the free end of the bar section 11, and through said member to be automatically released for moving into its engaging position, and to this end the bolt 14 is provided at its upper end with a pin or stud 19, that has movement within a vertically disposed slot 20 and an angularly disposed slot enlargement 21. When the bolt 14 is lifted by the pin 19, said pin is slightly turned to engage within the slot portion 21, and in that position holds the bolt 14, with its bevel face 15, in substantially the position shown in full lines in Fig. 3. In this position the bevel face 15 is disposed at a slight angle to its true position. When the bar 11 is moved to its closed position, the upper edge 13 of said bar engages with the inclined face 15 of the bolt and causes said bolt to be lifted, and this movement of the bolt causes the latter to be turned on its vertical axis by reason of the pin 19 engaging with the inclined edge 22 of the slot enlargement 21, resulting in that said pin 19 is moved into the path of the straight slot 20, when under the tension of the spring 16, the bolt 14 is moved to bodily engage with the tubular end 13. By reason of this bodily engagement of the bolt 14 with the tube section 11, it will be readily seen that said bolt could not be released from its engaging position through any ordinary jarring of the stanchion if such were likely to occur.

To mount the stanchion in the stall heads A and B the upper Y-member 1 is provided with a stud or pivot pin 23 that is secured in any suitable manner to the vertical leg 24 of said Y-member. And the lower Y-member 1 has the vertical leg 25 thereof provided with a bushing 26, which receives a bolt or pin 27, that is movable to engage with or be released from the stall head B. The means for releasing the bolt 27 from such engagement consists in a ring 28 that is connected to said bolt through the medium of chain links 29.

It is obvious that those skilled in the art may vary the details of construction and arrangement of parts without departing from the spirit of my invention, and therefore I do not wish to be limited to such features except as may be required by the claim.

What I claim is:—

In a cattle stanchion, the combination of two end members oppositely disposed; a continuous bar connecting said end members on one side; a sectional bar connecting said end members on the opposite side; said sectional bar comprising parts secured to the end members, a part pivotally mounted on one of the first mentioned parts and adapted to engage with the other of said parts, and said engaging parts having alining openings; a locking bolt mounted within the opening of one of said parts and adapted to move bodily into engagement with the opening of the adjacent part, said bolt having a beveled surface; means for holding said bolt in raised position and the beveled surface thereof at an angle to its normal position; said pivoted bar section adapted to engage with said beveled surface to lift said bolt and effect the turning thereof to normal position; and a spring associated with said bolt adapted to move the bolt into bodily engagement with the pivoted section to secure the latter, substantially as described.

In testimony whereof, I affix my signature, in presence of two witnesses.

GEORGE GLEASON.

Witnesses:
JAMES J. HARMER,
NEIL C. CLARK.

---

Copies of this patent may be obtained for five cents each, by addressing the "Commissioner of Patents, Washington, D. C."